(12) United States Patent
Hintz

(10) Patent No.: US 6,860,166 B2
(45) Date of Patent: Mar. 1, 2005

(54) TORQUE INDUCED PROPULSION SYSTEM

(76) Inventor: Nathaniel Joseph Hintz, 8805 Colorful Pines, Las Vegas, NV (US) 89143

( * ) Notice: Subject to any disclaimer, the term of this patent is extended or adjusted under 35 U.S.C. 154(b) by 8 days.

(21) Appl. No.: 10/309,734

(22) Filed: Dec. 3, 2002

(65) Prior Publication Data

US 2004/0103728 A1 Jun. 3, 2004

(51) Int. Cl.[7] .......................... G01C 19/30; G01C 19/02
(52) U.S. Cl. ...................................................... 74/5.47
(58) Field of Search .............................. 74/5 R, 5.7, 5.8, 74/5.47, 5.22, 87 R, 84 S

(56) References Cited

U.S. PATENT DOCUMENTS

| | | | |
|---|---|---|---|
| 1,416,038 A | 5/1922 | Lamme | 74/5.7 |
| 2,048,834 A | 7/1936 | Young | 33/320 |
| 2,819,053 A | 1/1958 | Pope | |
| 2,841,987 A | 7/1958 | Brown | 74/5.1 |
| 2,903,891 A | 9/1959 | Sedgfield et al. | 74/5.4 |
| 2,947,177 A | 8/1960 | Read | 74/5.6 C |
| 2,995,934 A | 8/1961 | Harvey et al. | 73/462 |
| 3,203,644 A | 8/1965 | Kellogg, Jr. | |
| 3,765,250 A | 10/1973 | Graefe | |
| 4,383,452 A | 5/1983 | Imbeninato et al. | |
| 4,409,856 A | 10/1983 | de Weaver, III | |
| 4,479,396 A | 10/1984 | de Weaver, III | |
| 4,712,439 A | 12/1987 | North | |
| 5,024,112 A | 6/1991 | Kidd | |
| 5,054,331 A | 10/1991 | Rodgers | |
| 5,090,260 A | 2/1992 | Delroy | |
| 5,150,626 A | 9/1992 | Navarro et al. | |
| 5,182,958 A | 2/1993 | Black | |
| 5,313,850 A | 5/1994 | Finvold et al. | 74/5.9 |
| 5,791,188 A | 8/1998 | Howard | |
| 5,860,317 A | 1/1999 | Laithwaite et al. | |
| 5,966,986 A | 10/1999 | Laul | |
| 6,571,652 B2 * | 6/2003 | Adcock | 74/5.7 |

* cited by examiner

*Primary Examiner*—Roger Pang
(74) *Attorney, Agent, or Firm*—Robert Ryan Morishita; Anderson & Morishita, LLC

(57) ABSTRACT

A gyroscopic device includes a drive gimbal drive ring spinning about a drive gimbal axis, a precession gimbal spinning about a precession gimbal axis substantially perpendicular to the drive gimbal drive ring, and a gyro coupled to the drive gimbal drive ring rotating about the precession gimbal axis and spinning about a moving gyro spin axis substantially parallel to the drive gimbal ring. The gyro rotation and spin generates a precession force about the drive gimbal axis that is either opposite or coincident the direction of the drive gimbal spin when the depending upon the direction of the gyro. The precession force can be used to propel an object.

6 Claims, 19 Drawing Sheets

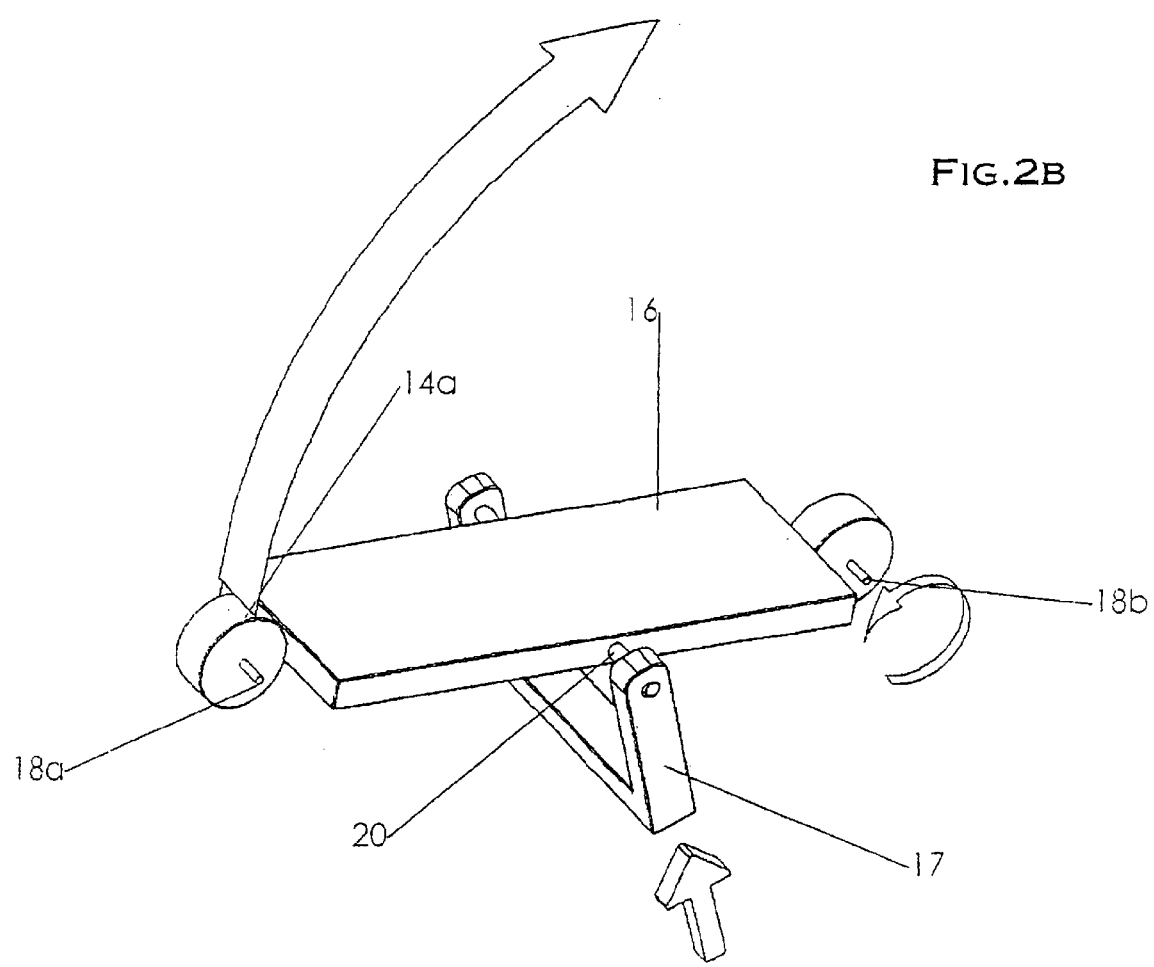

TORQUE INDUCED PROPULSION SYSTEM

FIELD OF THE INVENTION

This invention mainly relates to propulsion systems, but also relates to classroom demonstration devices of forces acting upon gyros and even kinetic art.

BACKGROUND OF THE INVENTION

Traditionally, machines that produce thrust or provide propulsion for aerial vehicles do so by either pushing against the air the way airplanes, jets, or helicopters do, or by expelling burned fuel the way rockets do. Many patents have been filed for propulsion systems that do not work in this conventional fashion. Many of these patents work against gyros to generate propulsion.

Patents such as U.S. Pat. No. 5,860,317 to Laithwaite (1999), U.S. Pat. No. 5,024,112 to Kidd (1991), UK patent 2,090,404 to Russell (1982), all describe gyro-based propulsion systems that have an excessive number of moving parts, U.S. Pat. No. 5,054,331 to Rogers (1991), U.K. patent 205,753 to Morgan (1988), U.S. Pat. No. 5,090,260 to Delroy (1992), and Japanese patent 60-56182 to Kiyunmeru (1985), also have the same problem. This adds unnecessary weight, decrease energy efficiency, and give cause for concern of mechanical breakdown. In addition, these overly complex machines seem unnecessarily expensive to build, making them impractical for manufacturing.

Propulsion system patents using principles other than gyros that claim to be able to produce the same type of propulsion (without expelling expended fuel or pushing against the medium through which they travel) suffer from the same problems of over complexity. Examples of these patents are U.S. Pat. No. 4,712,439 to North (1987), U.S. Pat. No. 4,409,856 to De Weaver (1983), U.S. Pat. No. 4,479,396 to De Weaver (1984). U.S. Pat. No. 5,150,626 to Nevarro (1992), U.S. Pat. No. 5,182,958 to Black (1993), U.S. Pat. No. 5,791,188 to Howard (1998), and U.S. Pat. No. 5,966,986 to Laul (1999).

Basically, every prior attempt at designing a propulsion system that can levitate a vehicle has failed to keep it simple.

The present invention is superior to the above patents due to its mechanical simplicity with only three moving components. There is less cause for concern of mechanical breakdown, and less weight, aside from the fact that the present invention is less expensive to manufacture. The present invention is more energy efficient due to fewer moving parts wasting energy in friction.

The present invention is also a beautiful, almost hypnotic, thing to watch when operated at slow speed making it desirable as a work of kinetic art.

The present invention component also may serve as educational tools as classroom demonstrations of the forces acting upon gyros. By turning the present invention by hand, the forces of the gyro can be felt by the amount of torque that it takes to turn it. The precession force of the gyro can be easily reversed to cause the present invention to be easy to turn instead of hard. The present invention component can then be a hands-on learning tool beneficial to schools everywhere.

SUMMARY OF THE INVENTION

The present invention is essentially a machine that uses the properties of a gyro to resist rotation with minimized friction. Resisting rotation of the armature of a motor allows the motor to rotate the object it is attached to instead. Specifically, a gyroscopic device includes a drive gimbal spinning about a drive gimbal axis. The drive gimbal is optionally driven by a motor, a hand crank, or the like. The drive gimbal includes a drive gimbal drive ring. A precession gimbal spins about a precession gimbal axis substantially perpendicular to the drive gimbal drive ring.

A gyro rotates about the precession gimbal axis and spins about a moving gyro spin axis substantially parallel to the drive gimbal ring. The gyro spin is coupled to, and guided by, the drive gimbal drive ring. The gyro spin generates a precession force about the drive gimbal axis that is opposite the direction of the drive gimbal spin when the gyro is guided in a first direction and coincident the direction of the drive gimbal spin when the gyro is guided in a second direction opposite the first direction.

This precession force can be transmitted in a variety of optional ways. The gyroscopic device may optionally be mounted on a platform such that the precession force is parallel to the platform. If a second gyroscopic device is mounted to said platform, the gyroscopic devices are mounted such that the precession forces of the two gyroscopic devices are parallel and, optionally, coplanar. By alternately applying driving the drive gimbals of the two gyroscopic devices, the precession forces transmitted to the platform can be used to move the platform.

In a further optional embodiment including two gyroscopic devices mounted to a platform, an optional pivot about which the platform may rotate is disposed perpendicular to the precession forces. This permits at least a component of the rotational forces generated by said gyroscopic devices and transmitted to said platform to be converted to linear force.

In another alternate optional embodiment, the gyroscopic device is mounted to a platform opposite a counterweight. An axle is secured to the platform between the gyroscopic device and the counterweight parallel to the precession force. A universal joint couples the axle to a surface such that at least a component of the rotational force generated by the gyroscopic device and transmitted to said platform is converted to a linear force on the surface.

BRIEF DESCRIPTION OF THE DRAWINGS

FIGS. 2A and 2B are elevated perspective views of how torque can be used to propel an object without tipping the entire object side to side;

Figure 1A:
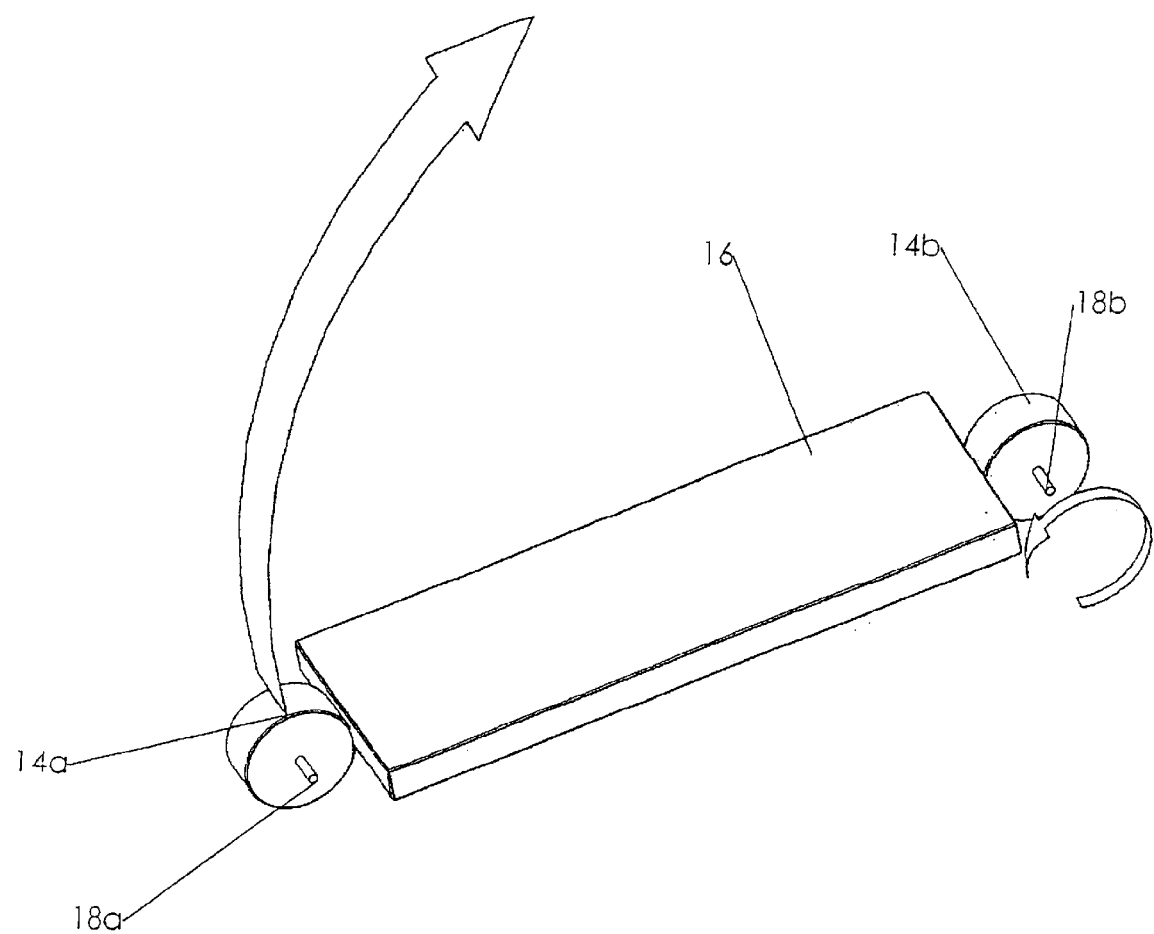
FIGS. 1A and 1B are elevated perspective views of how torque can be used to propel an object by rotating it around a set of motors.

REFERENCE NUMERALS IN DRAWINGS 14A first armature motor
14B second motor
16 vehicle or base
17 hinge
18A first motors
18B second motors armature
20 axles
22 forces applied to gyro
24 gyros
26 precession force
28 drive gimbal rotation
30 precession gimbal rotation
32 gyro rotation
34 stationary gimbal bearing ring
36 stationary gimbal gear drive ring
38 drive-motor
40 legs
42 bolts or welds
44 bearing holes
46 bearings
48 though-holes
50 axles
52 stationary gimbal smooth drive ring
54 small gears
56 small wheels
58 collars
60 drive gimbal bearing ring
62 drive gimbal gear drive ring
64 axle holes
68 collar bolt
70 long collar
72 flat side on axle
74 drive gimbal smooth drive ring
76 precession gimbal ring
78 small gear bolts
80 sphere shaped gyro
82 gyro axle
84 disc shaped gyro
86 aluminum cylinder
88 coil
90 armatures
92 brushes
94 system assemblies
96 upward forces
98 oscillation motor
100 counter weight
102 torque reaction from system
103 rotation altering direction of torque
104 universal joints
106 frame
108 oscillation motor axle
112 crank
114 handle

DESCRIPTION

Reference is now made to the figures wherein like parts are referred to by like numerals throughout.

Figure 1B:
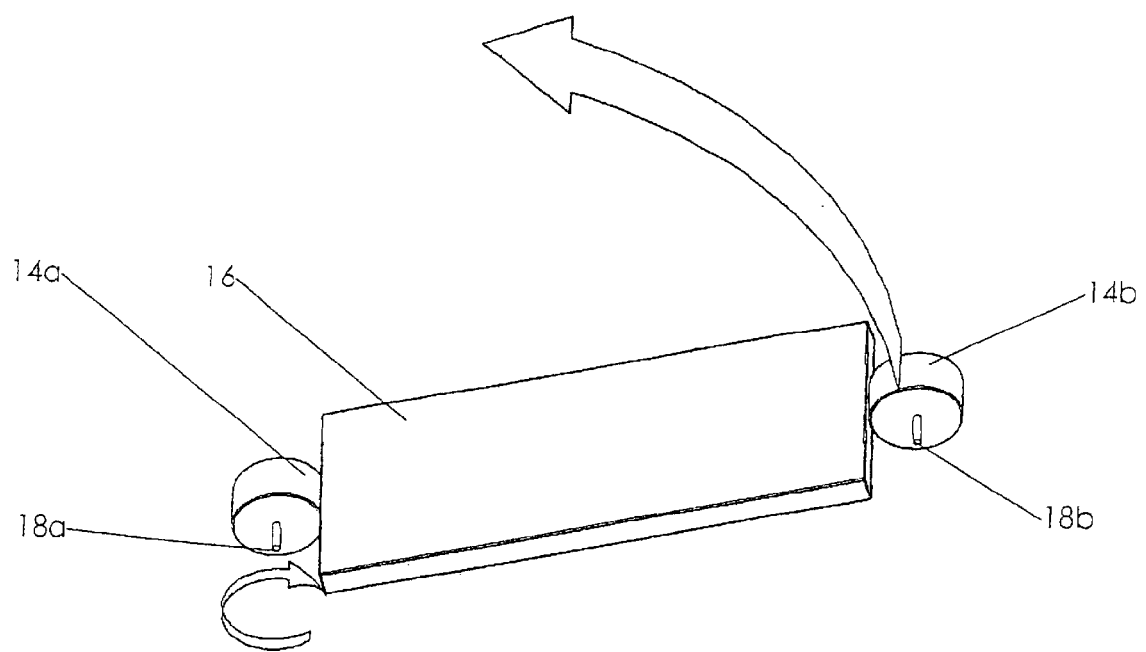

Referring first to FIGS. 1A and 1B, the present invention provides propulsion by applying torque to an object to be propelled (or vehicle) from alternating sides. The present invention uses torque to move one side of the vehicle in front of the other by rotating the vehicle around a motor, one side at a time.

FIGS. 1A and 1B illustrate two motors 14A, 14B attached to an object 16. FIG. 1A illustrates one motor 14A turned on while the other motor 14B is off. The torque of the on motor 14A upon its armature 18A applies an equal and opposite torque upon the object 16 causing it to move, thus initiating the propulsion. The arrows in this series of illustrations indicate directions of torque inducing the motion.

FIG. 1B illustrates the previously off motor 14B is now on and vice versa. The torques of the on motor 14B upon its armature 18B induces the equal and opposite torque to then propels the second side of the object 16. The torque of these motors 14A, 14B is alternated side to side to avoid only creating stress on the vehicle instead of motion.

The process of FIGS. 1A and 1B is repeated to propel the vehicle by rotating one side at a time toward the direction it is to travel. With the system's ability to resist rotation, the rotation of the motors can be used to rotate the vehicle instead of the motors' armatures 18A, 18B.

Figure 2A:
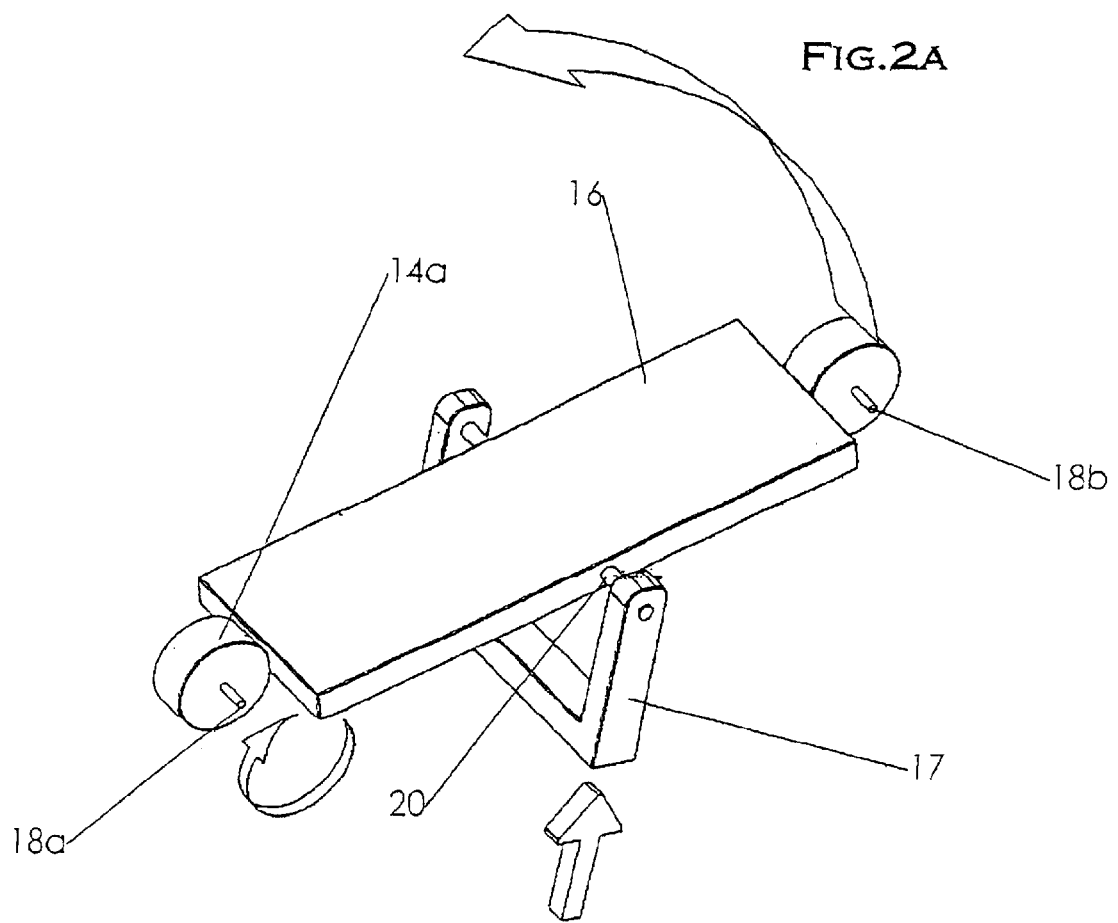

Another concept of operation is illustrated in FIGS. 2A and 2B that prevents the vibration of tipping the entire vehicle side to side as in FIGS. 1A and 1B. The operation in FIGS. 2A and 2B is the same as in FIGS. 1A and 1B with one exception. An axle 20 is attached between the motors 14A, 14B and is attached to the vehicle 16. In FIG. 2A, the torque of the motor 14A rotates the other motor 14B around the axle 20. In doing so, the vertical component of the rotational force turn lifts the vehicle by applying an upward force upon the axle 20. The process repeats in FIG. 1B but with the opposite motor 14B activated instead.

Figure 3A:
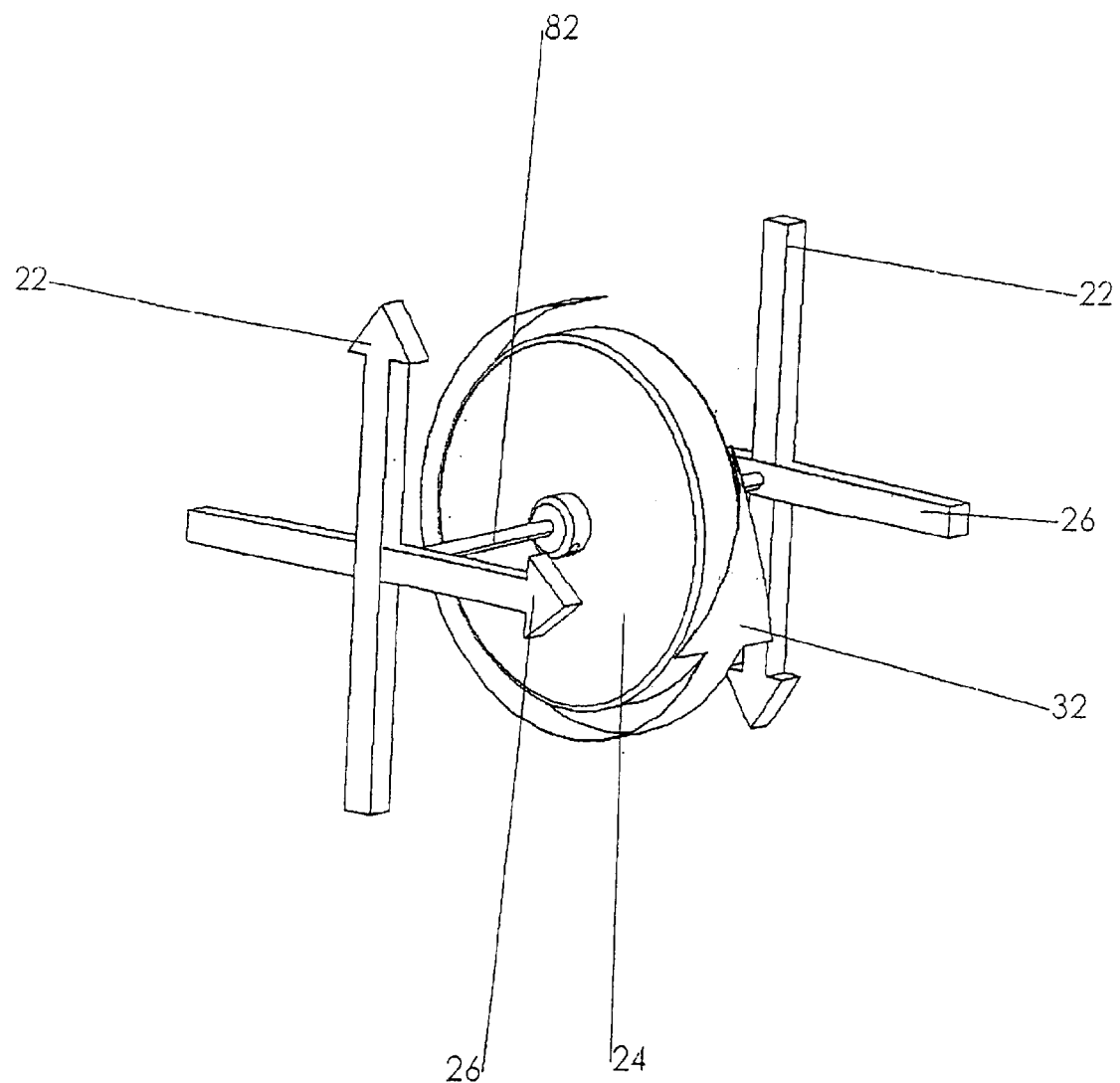
FIGS. 3A and 3B are elevated perspective views how changing the direction of rotation of a gyro, changes the direction of its precession force.
Figure 3B:
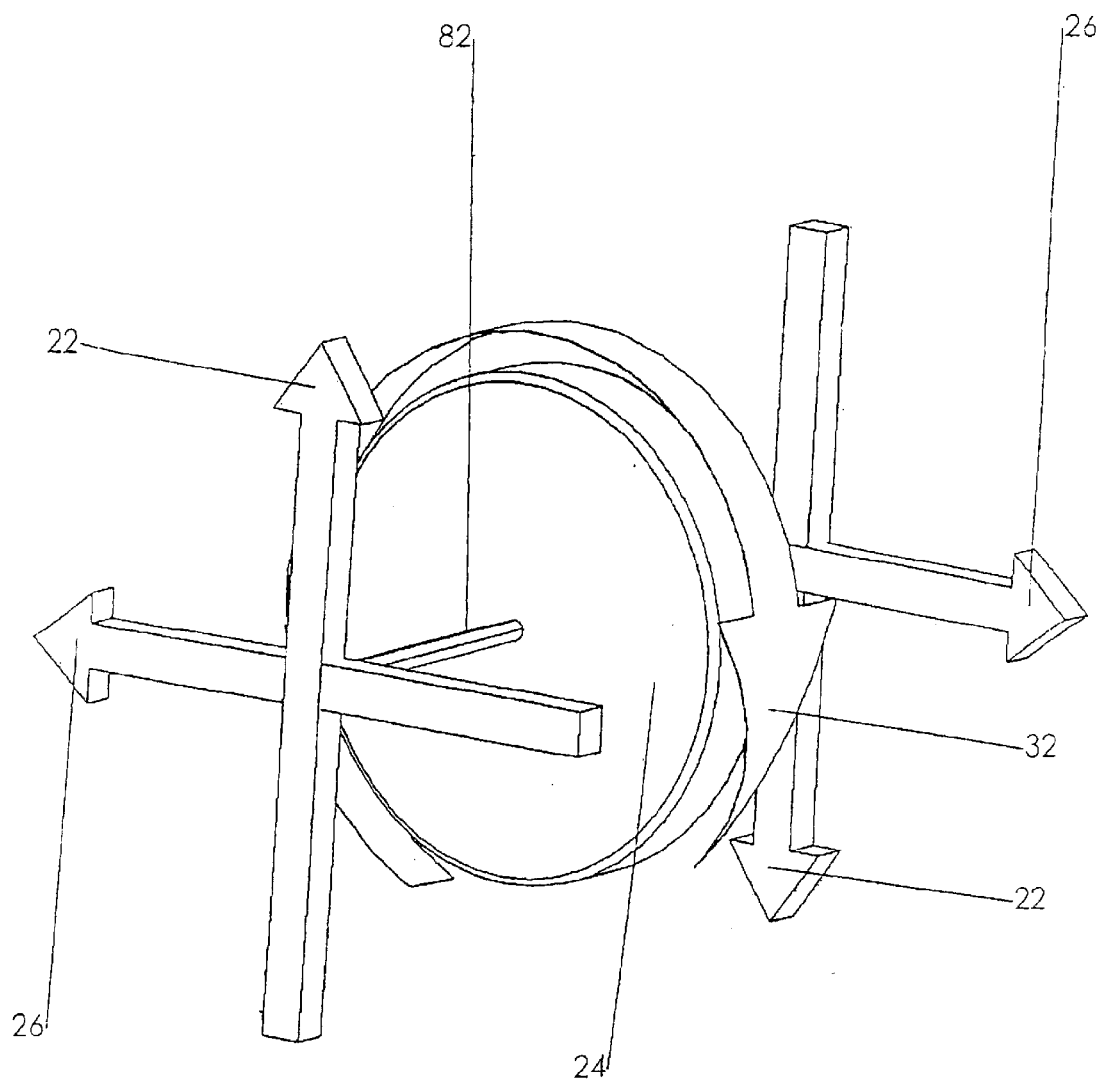

To resist rotation, the present invention uses the principle of gyroscopic precession to work against the direction of a motor's rotation. FIG. 3A illustrates that when a force 22 is applied to a spinning gyro 24 to rotate it off its axis; there is a precession force 26 perpendicular to the applied force 22. FIG. 3B illustrates that when the direction of the gyro rotation 32 is reversed, the direction of the precession force 26 is reversed. Thus by controlling the direction of the gyro rotation 32, the present invention can cause the precession force 26 to act against the motor rotation.

Figure 4:
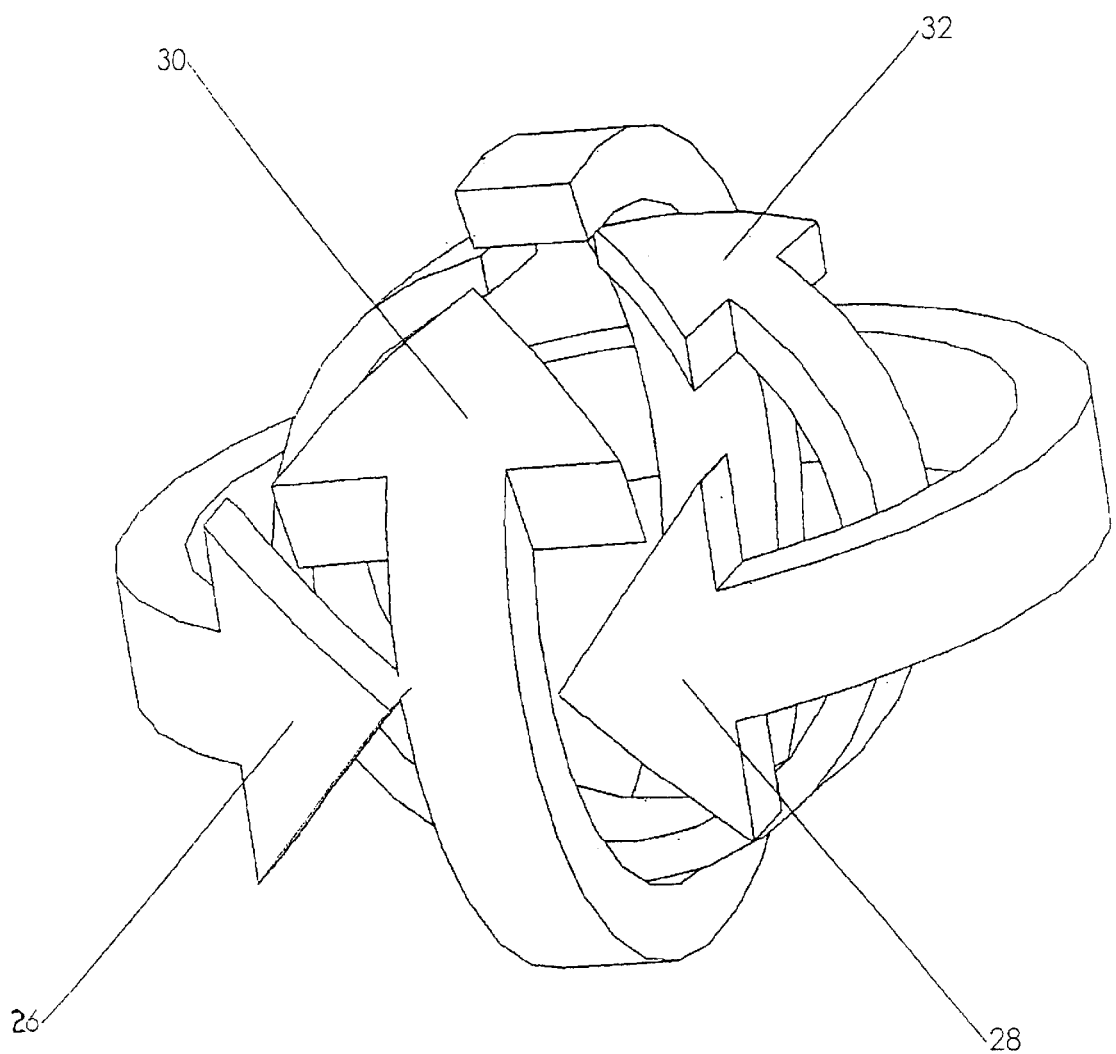
FIG. 4 is an elevated perspective view of the three combined motions a system according to an embodiment of the present invention induces.
Figure 12:
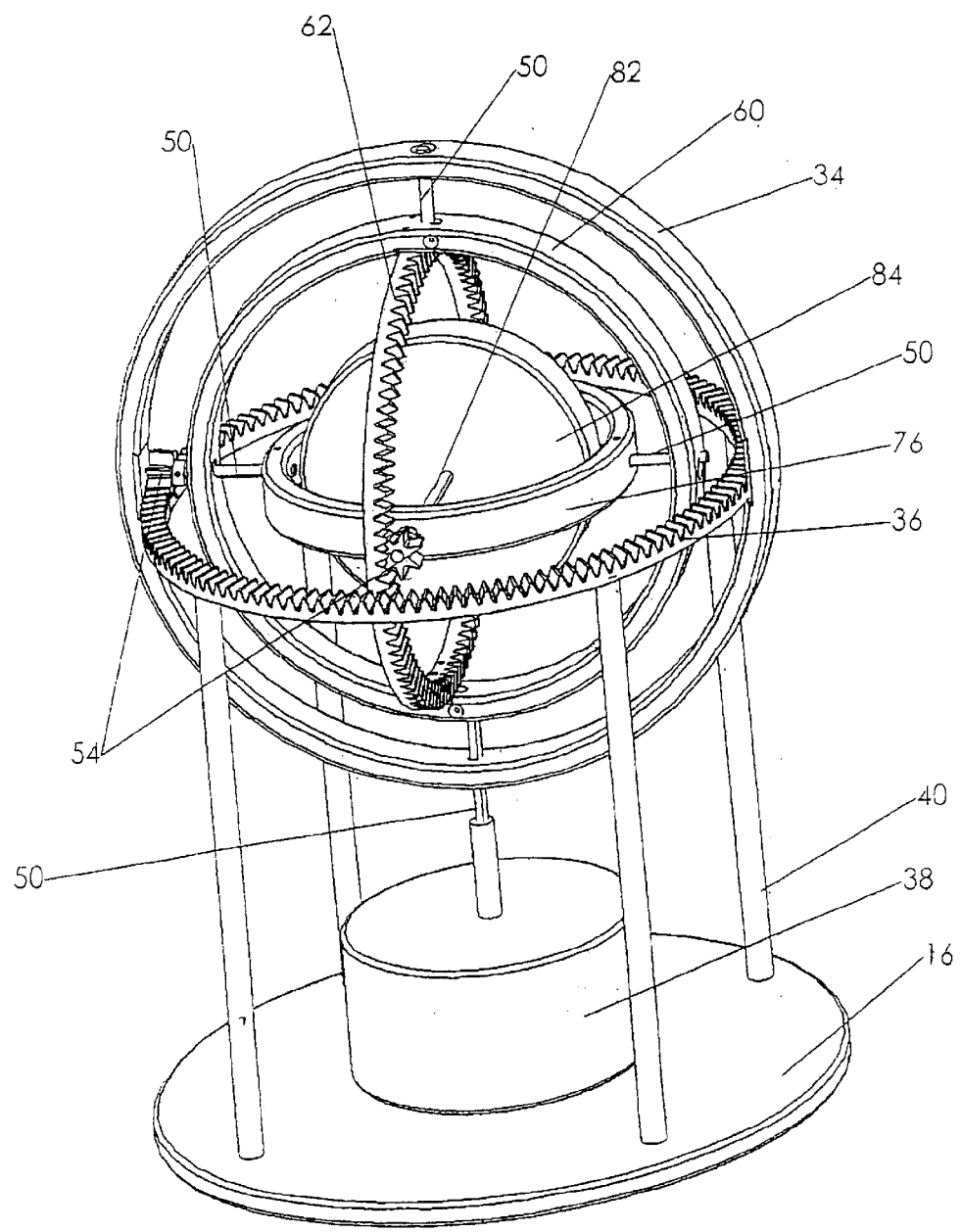
FIG. 12 is an elevated perspective view of an assembled system in the same orientation as the forces shown in FIG. 4.
Figure 13:
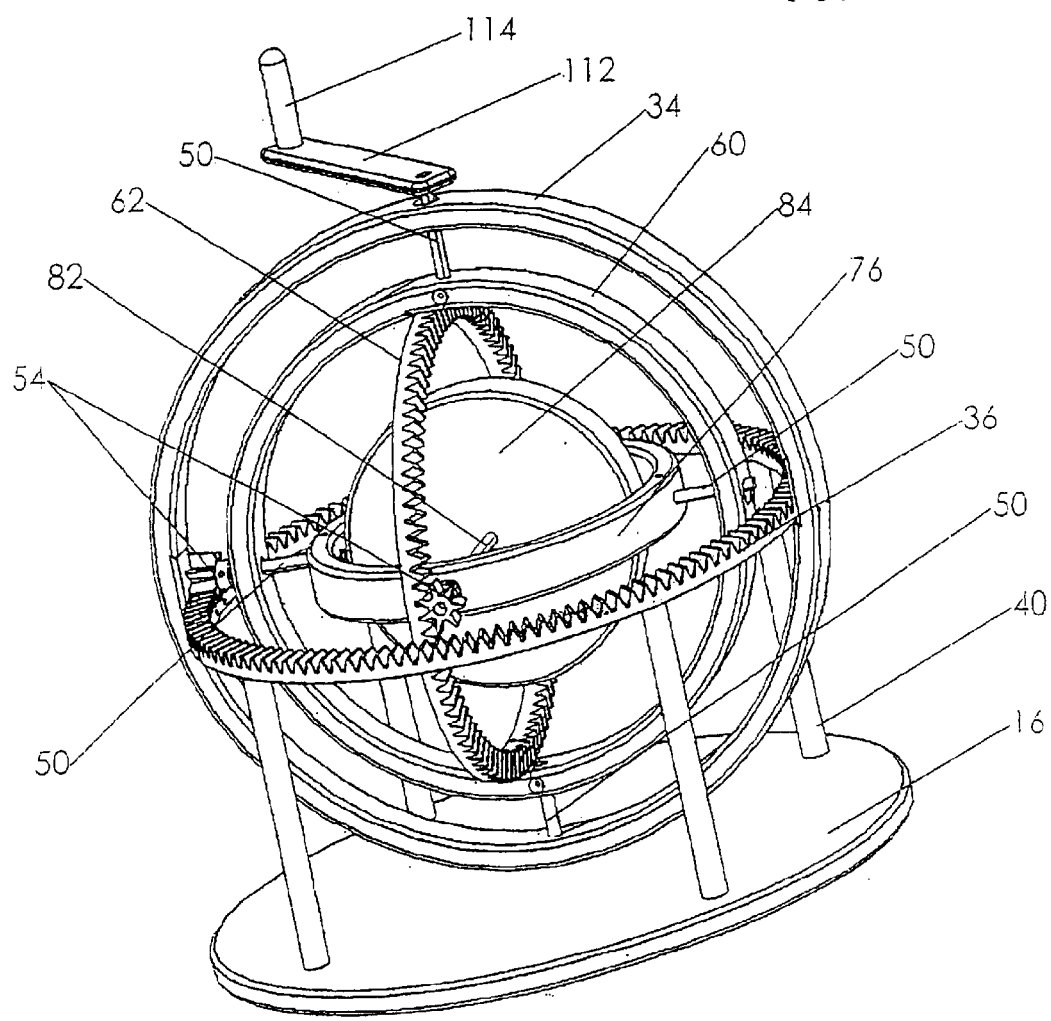
FIG. 13 is an elevated perspective view of an alternate embodiment of an assembled system in the same orientation as the forces shown in FIG. 4.

This invention has only three moving components, each having a simple rotary motion. Although, this invention itself is simple, the combination of these three rotations results in a rather complex motion. Referring generally to FIGS. 4, 12, and 13, the gyro 84 in the center of the invention rotates on all three axes (x, y, and z-axes) simultaneously. The invention resists rotation by working against the precession force 26 from rotating the gyro 84 off its axis. Applying a greater load on the motors (using a heavier gyro or gearing it to spin faster) reduces the speed of the motors' rotation, thus causing more torque to be transferred to the vehicle. Energy efficiency is improved since the motors do not have to rotate as rapidly to cause the vehicle to rotate.

The invention is comprised of four primary components. A drive gimbal 60, 62 rotates inside a stationary gimbal 34, 36. A precession gimbal 76 rotates inside the drive gimbal 60. A gyro 84 rotates inside the precession gimbal 76. In FIG. 4, the direction of the precession force 26 is exactly opposite to the direction of rotation 28 of the drive gimbal 60, 62. The direction of rotation 28 of the drive gimbal 60, 62 is indicated as the outermost curved arrow 26, 28. Then the direction of rotation 30 of the precession gimbal 76 relative to the drive gimbal 60, 62 is indicated as the curved arrow perpendicular to, and inside of the outermost arrow 26, 28. The direction of rotation 32 of the gyro 84, relative to the precession gimbal 76 is indicated as the innermost curved arrow 32.

Figure 5:
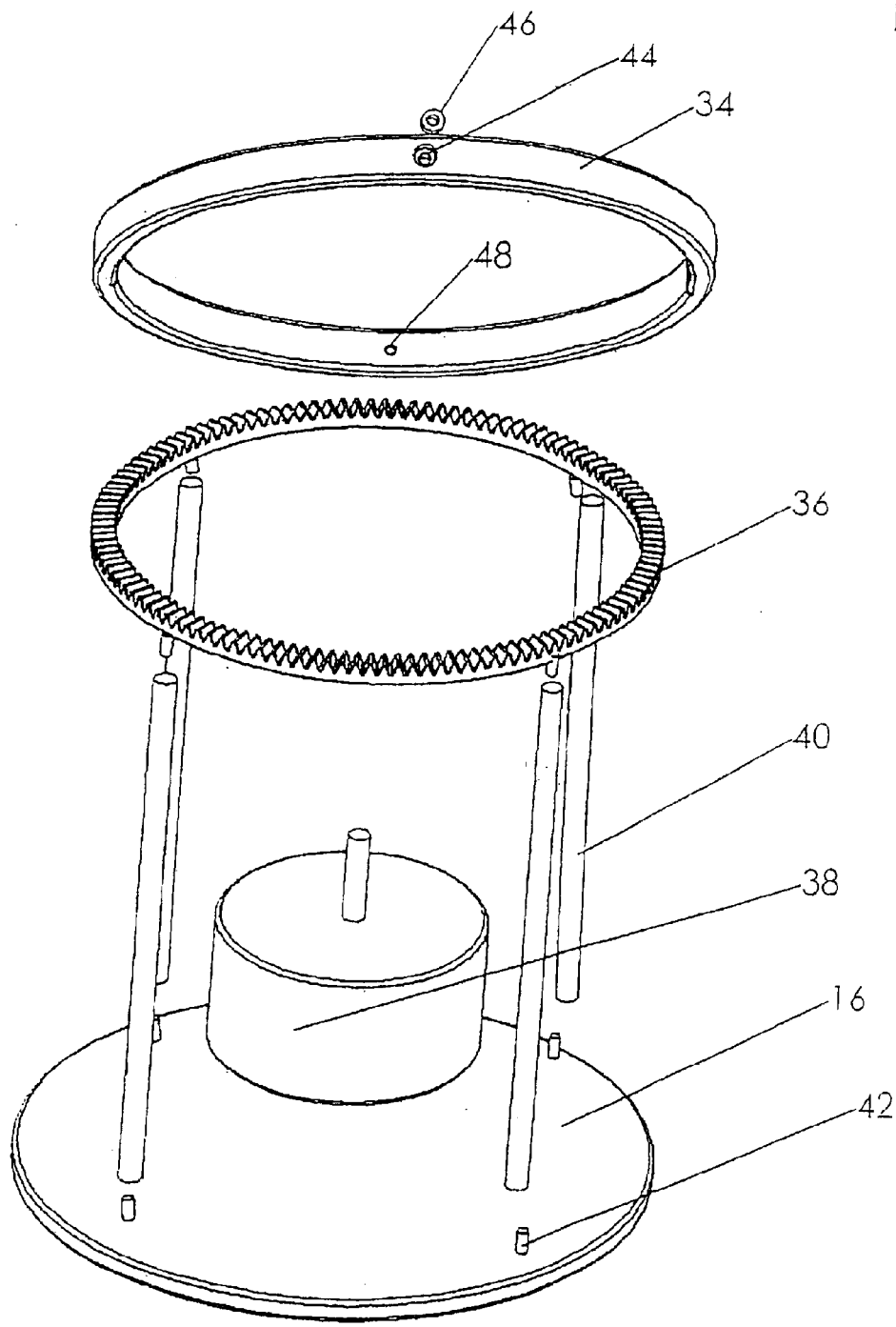
FIG. 5 is an elevated perspective view of an embodiment of a stationary gimbal.

FIG. 5 shows the two rings of the stationary gimbal—a stationary gimbal bearing ring 34 and a stationary gimbal drive ring 36. The stationary gimbal is to be supported above a motor 38 using legs 40 extending from a base 16 to the stationary gimbal drive ring 36. Bolts 42 affix the legs 40 the base 16 to the drive-ring 36. The stationary gimbal bearing ring 34 is attached vertically to the outside of the horizontal stationary gimbal drive ring 36 with bolts 42. Holes 44 countersunk into the stationary gimbal bearing ring 34 allow bearings 46 to be pressed in from the outside of the stationary gimbal bearing ring 34. Through holes 48 allow axles 50, shown in FIG. 7, to pass through the stationary gimbal bearing ring 34.

Figure 6:
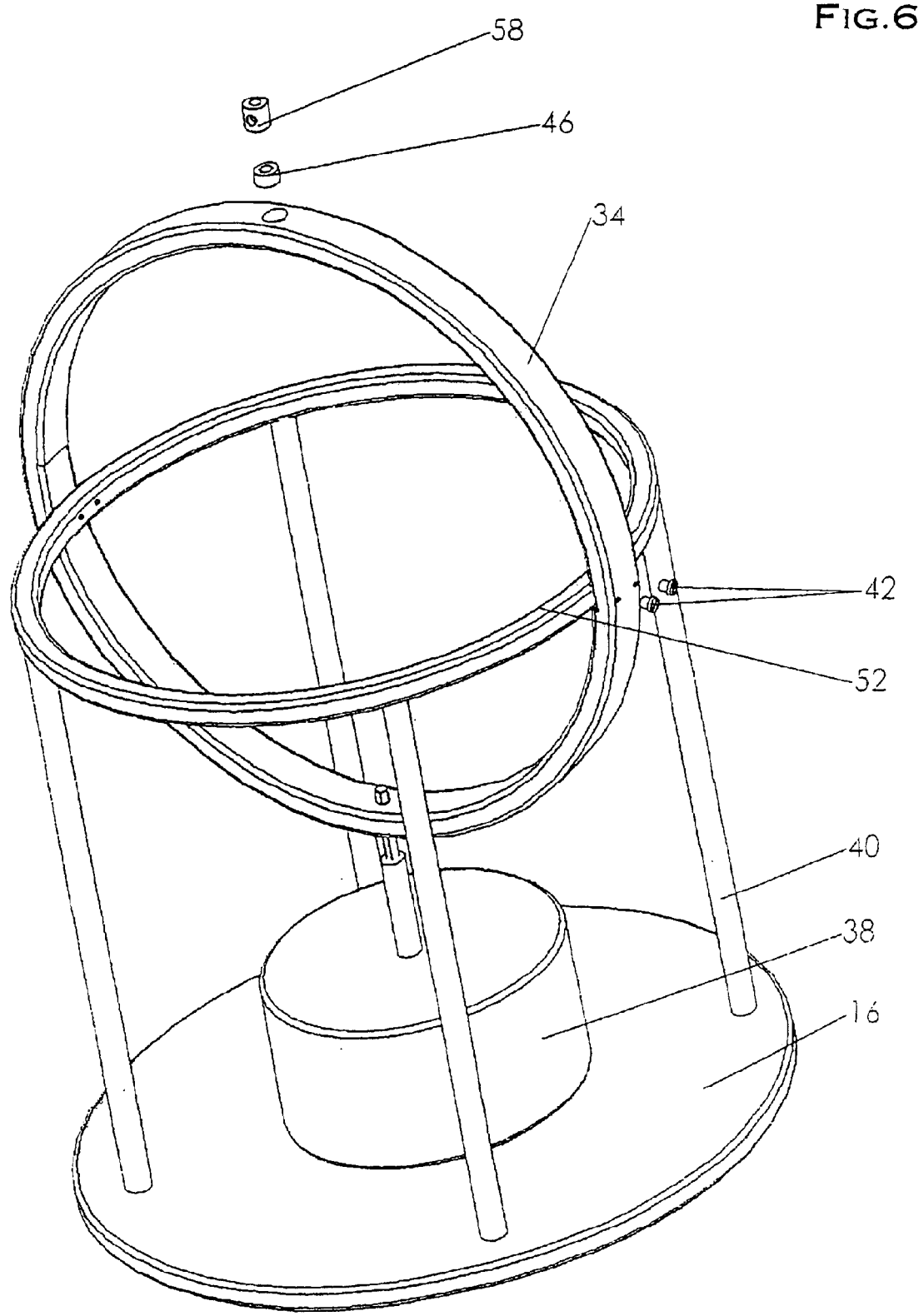
FIG. 6 is an elevated perspective view of an alternate embodiment of a stationary gimbal.
Figure 9:
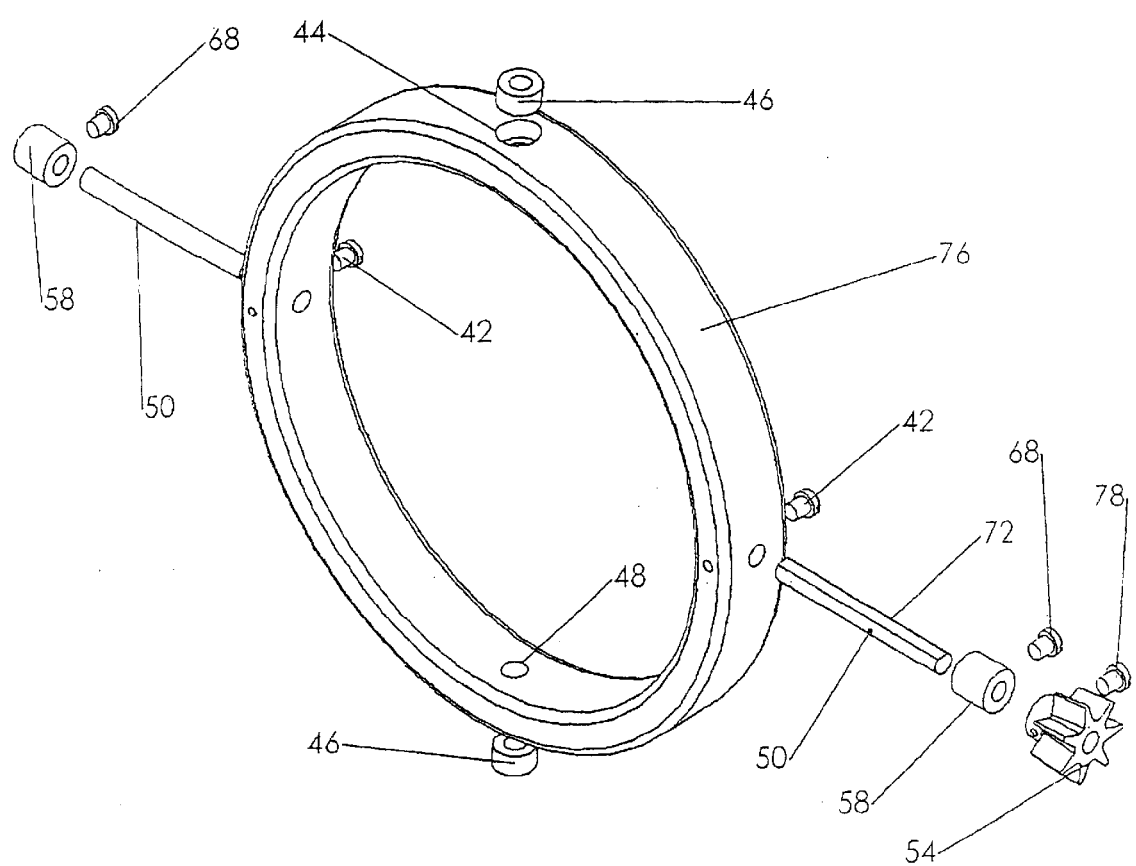
FIG. 9 is an elevated perspective view of an embodiment of a precession gimbal.

FIG. 6 shows an alternate embodiment in which the stationary gimbal drive ring 52 is smooth rather than geared as in the embodiment of FIG. 5. That is, the stationary gimbal drive ring 36 shown in FIG. 5 accommodates a small gear 54 on an axle of the precession gimbal as shown in FIG. 9. However, a smooth stationary gimbal drive ring 52 shown in FIG. 6 accommodates a small wheel 56 instead. FIG. 6 also illustrates the bearings 46 to be pressed into the bearing-ring 34 from the inside of the ring, where collars 58 on the drive gimbal axles 50 can then be on the inside of the stationary gimbal bearing ring 34. The bearings 46 are optional and can be omitted in another embodiment or could be replaced with sleeves or bushings (not shown). The stationary gimbal bearing ring 34 could also be replaced with a half circle (not shown) to reduce weight and to change the appearance of the machine. FIG. 6 also illustrates the stationary gimbal bearing ring 34 attached to the stationary gimbal drive ring 52 using bolts 42. While it is contemplated that the present invention would likely be constructed of metal, other materials, such as wood, glass, or any type of solid plastic could also be used so long as the materials could withstand the forces generated.

Figure 7:
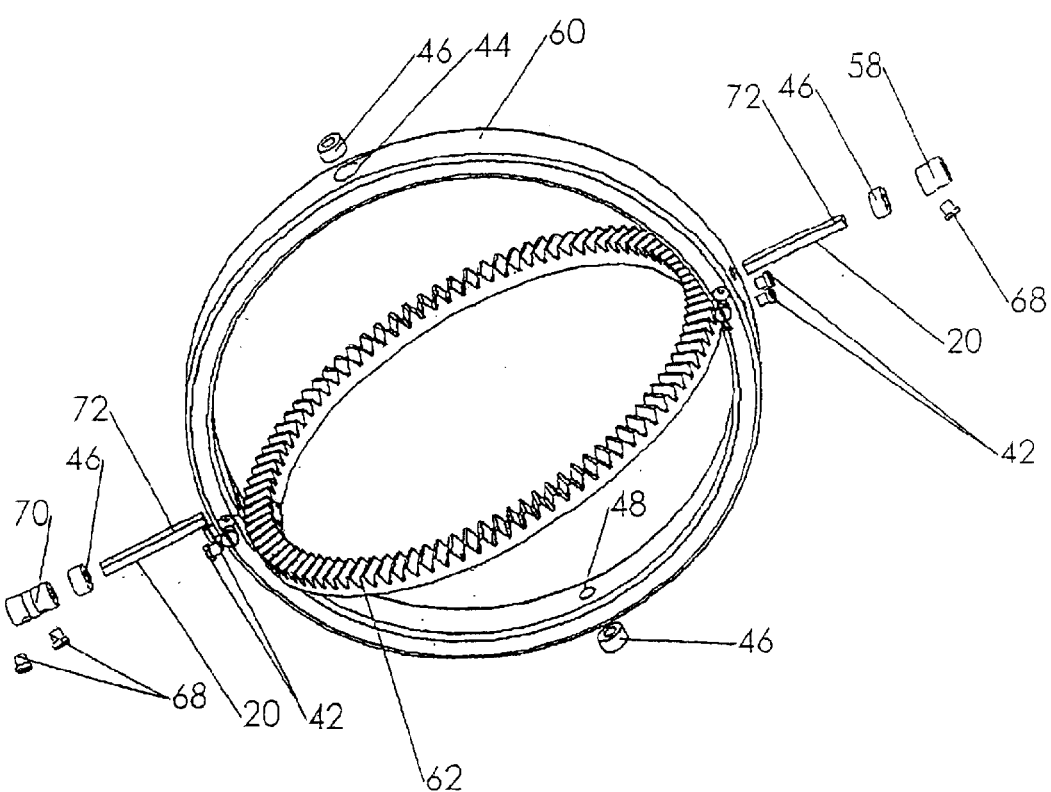
FIG. 7 is an elevated perspective view of an embodiment of a drive gimbal.

The drive gimbal shown in FIG. 7 also comprises two rings—a drive gimbal bearing ring 60 and a drive gimbal drive ring 62. The drive gimbal bearing ring 60 has bearing holes 44 countersunk to accommodate the precession gimbal bearings 46. The gear drive ring 62 is attached vertically to the inside of the horizontal bearing ring 60 with bolts 42 perpendicular to the bearing holes 44. An axle 20 attached through an axle hole 64 in the top of the drive ring 62 with a bolt 42 extends through the top of the stationary gimbal. This axle 20 passes through bearings 46 pressed into the top of the stationary gimbal and is held in place with a collar 58 bolted to the axle 20 with a sleeve-bolt 68. Another axle 20 attached through an axle-hole 64 in the bottom of the drive gimbal drive ring 62 with a bolt 42 and extends through the bottom of the stationary gimbal. This axle 20 passes through the bearings 46 pressed into the bottom of the stationary gimbal and is held in place by a long-sleeve 70 attached with a sleeve-bolt 68. This long-sleeve 70 is to be long enough to also attach to a motor using another sleeve-bolt 68. A flat side 72 on both the axles 20 as well as the motor is used to allow the sleeve-bolts 68 to attach without slipping.

Figure 8:
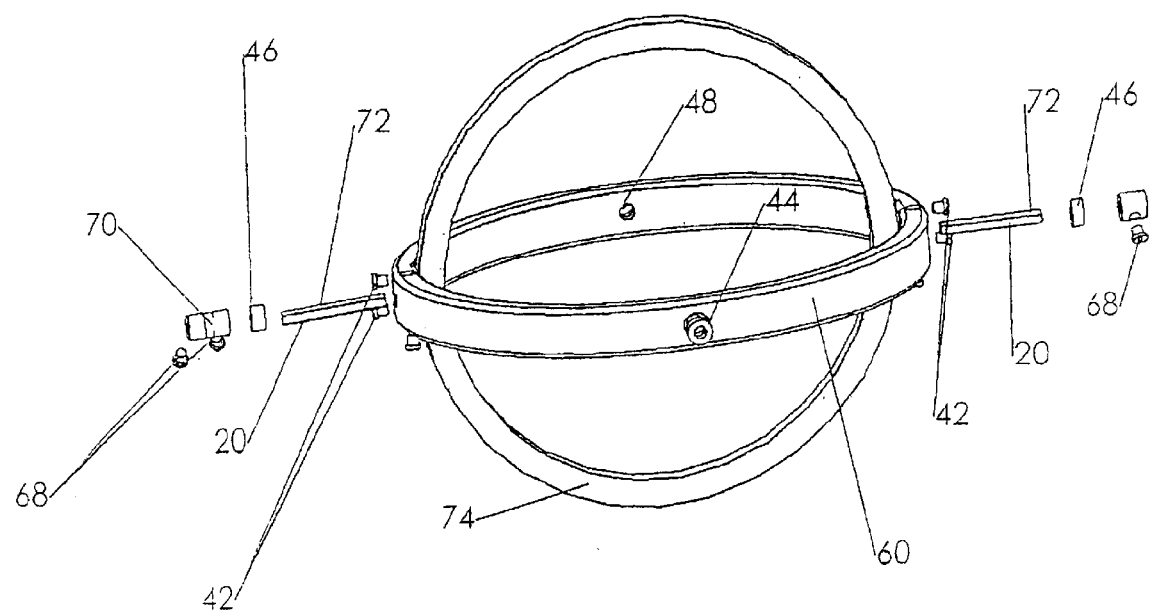
FIG. 8 is an elevated perspective view of an alternate embodiment of a drive gimbal.

FIG. 8 illustrates the drive gimbal with a smooth drive gimbal drive ring 74 as opposed to a geared drive gimbal drive-ring 62 as shown in FIG. 7. The geared drive gimbal drive ring 62, as in FIG. 7, accommodates a small gear 54 on an axle 20 of the gyro 84 as shown in FIG. 12. However, the smooth drive gimbal drive-ring 74 shown in FIG. 8 accommodates a small wheel 56 instead.

FIG. 8 also illustrates the bearings 46 to be pressed into the stationary gimbal bearing ring 34 from the inside of the stationary gimbal bearing ring 34, where collars 58 on the gyro axles 20 can then be on the inside of the stationary gimbal bearing ring 34. The bearings 46 can be omitted in another embodiment, or they could be replaced with sleeves or bushings (not shown). The bearing-ring could also be replaced with a half circle (not shown) to reduce weight and to change the appearance of the machine.

Turning to FIG. 9, the precession gimbal 76 comprises only one ring with holes 44 for the gyro bearings 46 to be pressed into at opposite ends. An axle 50, perpendicular to the bearing holes 44, is attached through a hole 64 in the precession gimbal 76 with a bolt 42. This axle 50 passes through one of the bearings 46 in the drive gimbal and is held in place with a collar 58 attached to the axle 50 with a bolt 42. Another axle 50 is also attached through a hole 64 in the precession gimbal 76 with a bolt 42. This axle 50 extends opposite to the first axle through the other bearings 46 in the drive gimbal. This axle 50 is then attached to a small gear 54 with a bolt 78, or a wheel 56 can be used if a smooth drive ring 74 is used as in FIG. 8, that rolls along the drive ring 36 of the stationary gimbal as the drive gimbal rotates, thus causing the precession gimbal 76 to rotate end over end as it revolves. Both of the precession gimbal axles may also have flat sides 72 to prevent attaching bolts 42, 68, 78 from slipping.

Figure 10:
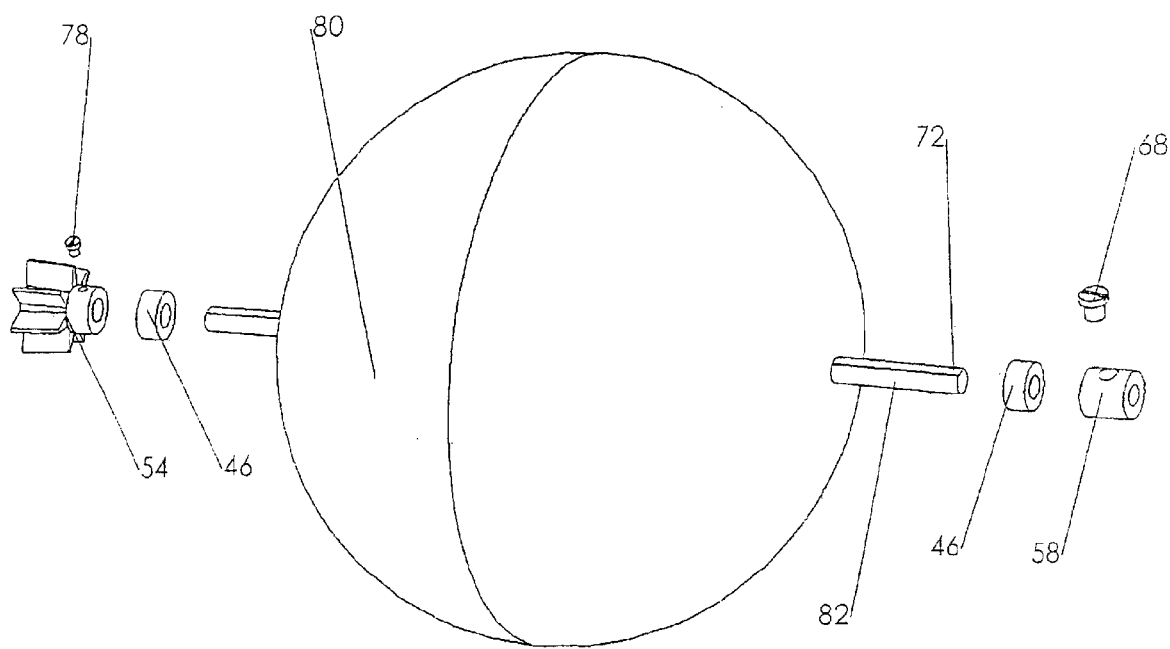
FIG. 10 is an elevated perspective view of an embodiment of a gyro.

In FIG. 10, a gyro flywheel 80 is shaped as a sphere as to maximize inertia and the gyro precession force. Both ends of the gyro axle 82 extend through the bearings 46 in the precession gimbal. One end of the gyro axle 82 is held in place with a collar 58 after passing through the bearings 46. A gear 54 is attached to the other end of the gyro axle 82 with a bolt 78. Again flat sides 72 on the gyro axle 82 could be used to prevent attaching bolts 68 & 78 from slipping. The gear 54 rolls along the drive gimbal drive ring 62 causing the gyro to spin. Thus the gyro 84 rotates as the precession gimbal 76 revolves inside the drive gimbal 60, 62.

Figure 11:
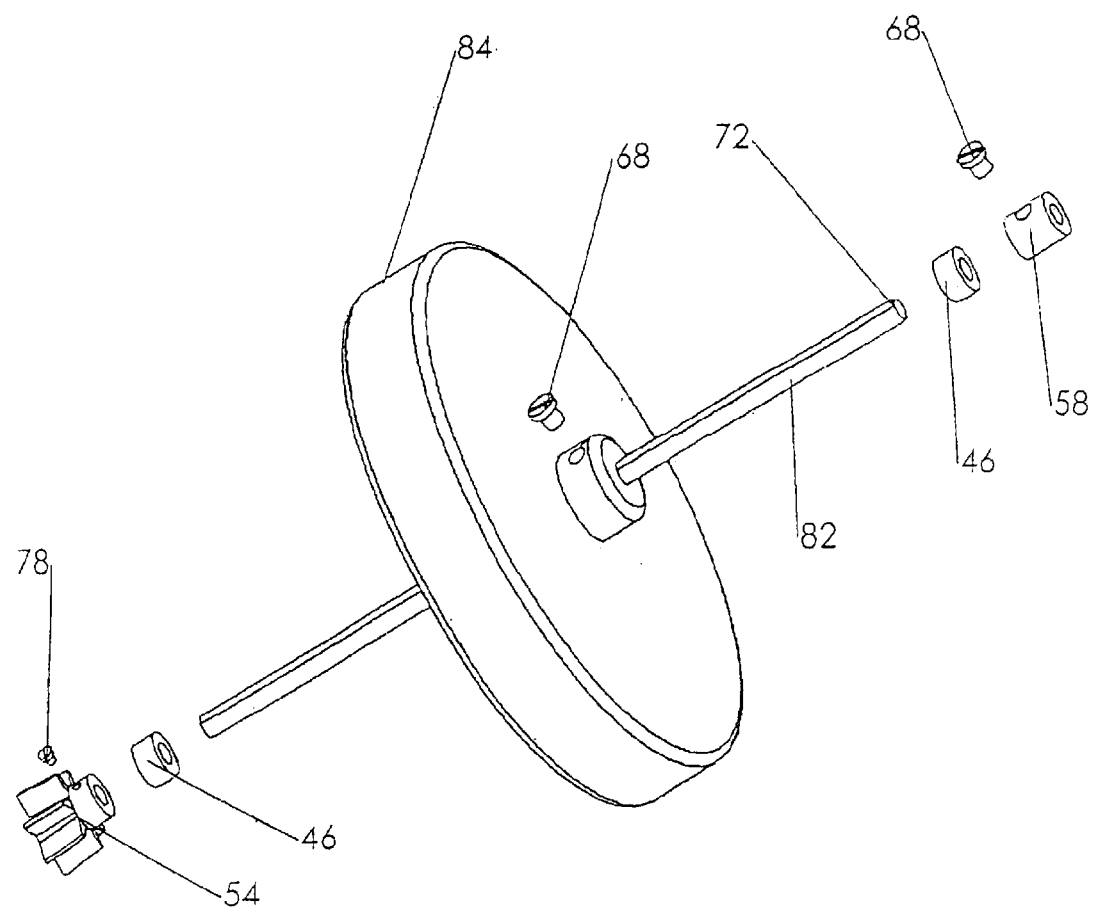
FIG. 11 is an elevated perspective view of a gyro in shape of a disk.

FIG. 11 illustrates an alternate embodiment of the gyro 84 in which the flywheel is in the shape of a disc to minimize the weight as traditional gyro-flywheels are constructed. Also illustrated is a wheel 56, as opposed to the gear 54 illustrated in FIG. 10, to roll upon the smooth drive gimbal drive ring 74 illustrated in FIG. 8.

FIG. 12 illustrates the present invention fully assembled. From this drawing, the simplicity and beauty of the present invention becomes evident. Visualizing the motions illustrated in FIG. 4 taking place in FIG. 12, this machine is a work of kinetic art as well as a propulsion system component.

Coupled to the drive gimbal is a drive motor 38. As can be appreciated from FIGS. 4 and 12, a stationary gimbal, including a stationary gimbal drive ring 36, is fixed with respect to the motor. A rotatable drive gimbal, including a drive gimbal drive ring 62, is mounted inside the stationary gimbal and is driven by a drive motor 38 to spin about a drive gimbal axis substantially perpendicular to the stationary gimbal drive ring 36.

A precession gimbal 76 is mounted inside the drive gimbal and is coupled to the stationary gimbal drive ring 62 through a wheel, gear, 54, or the like. The motion of the drive gimbal about the drive gimbal axis is transmitted through bearings 46 in the drive gimbal bearing ring 34 to the precession gimbal. The transmitted motion drives the gear 54 around the stationary gimbal drive ring 62 to spin the precession gimbal 76 about a precession gimbal axis substantially perpendicular to the drive gimbal drive ring.

A gyro 84 is mounted inside the precession gimbal and is coupled to the drive gimbal drive ring 62 through a wheel, gear 54, or the like. The motion of the precession gimbal 76 is transmitted to the gyro 84 through bearings 46 in the precession gimbal to cause the gyro to spin about an axis substantially parallel to the drive gimbal drive ring and rotate about the precession gimbal axis. The direction of the gyro spin generates a precession force about the drive gimbal axis opposite the direction of the drive gimbal spin.

FIG. 13 illustrates an alternate embodiment of the present invention in which the motor 38 is replaced by a hand crank on the top axle 50 of the drive gimbal. Such an embodiment could be useful in demonstrating the operating principle of the present invention because the gear 54 on the gyro 84 can be interchanged with the sleeve 58 on the other end of its axle 82. Thus causes the gyro 84 to change its direction of rotation 32 from that shown in FIG. 4. This in turn changes the direction of the precession force 26, from counteracting the motion of the drive gimbal 28, to working with it. Therefore the crank 112 is easier to turn instead of harder. By turning the machine by hand using the handle 114, the gyroscopic force can be felt, making the present invention useful as a demonstration model.

Figure 14:
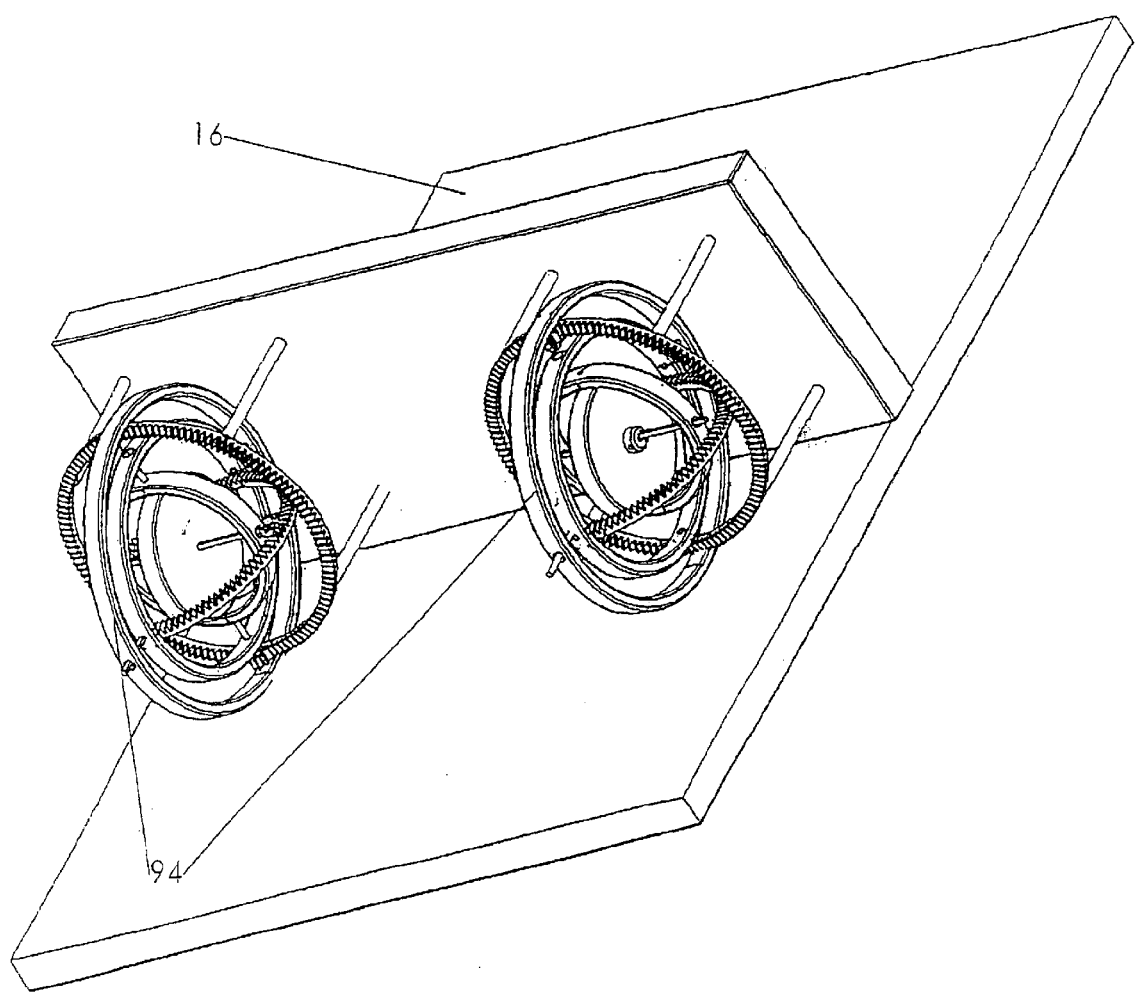
FIG. 14 is an elevated perspective view of an embodiment of the system.

Referring to FIG. 14, by using two system components together, a vehicle 16 that they are attached to is forced to move just as in FIGS. 1A and 1B. That is, each side of a vehicle 16 can be driven incrementally forward. Thus, with the system components fixed rigidly to the vehicle, they can be powered by an internal combustion engine without many technical difficulties.

Figure 15:
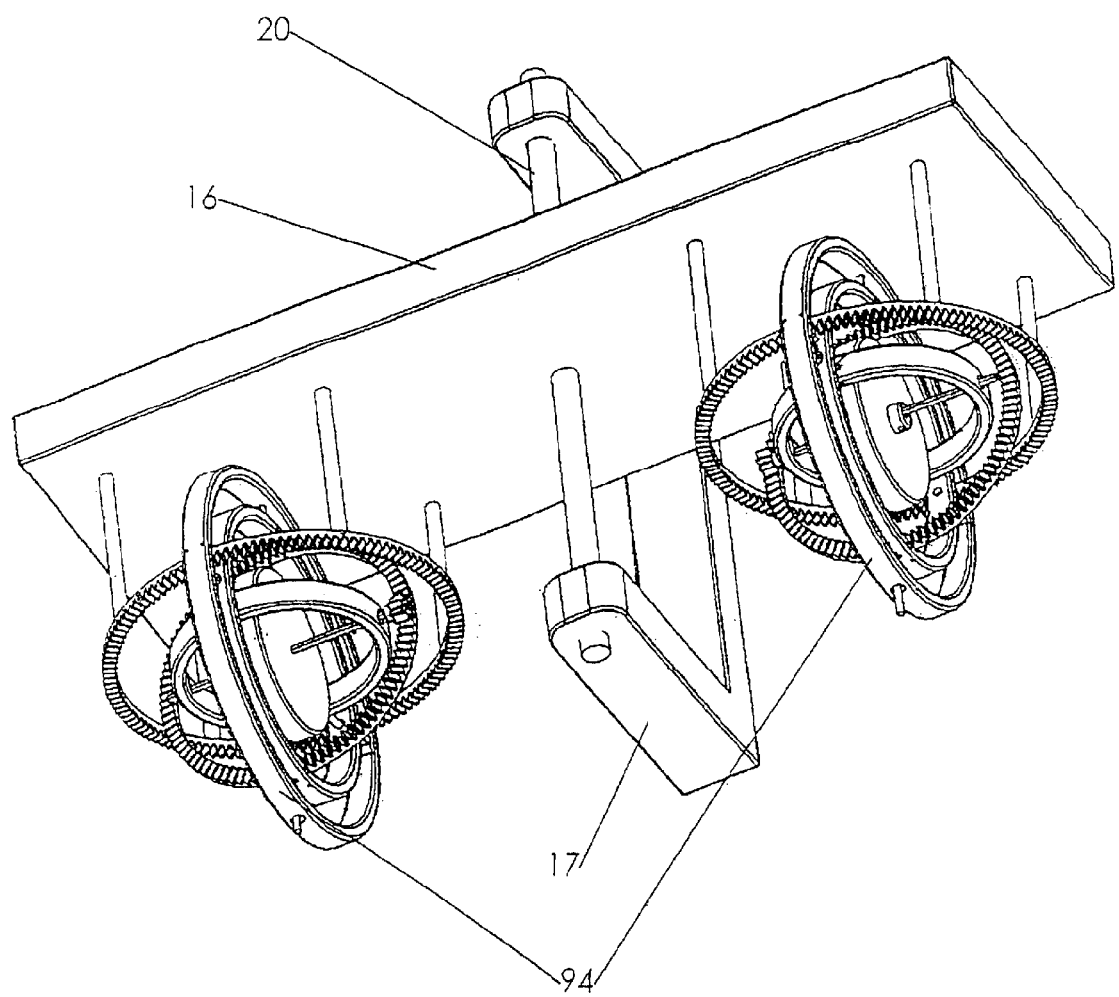
FIG. 15 is an elevated perspective view of an alternate embodiment of the system.

As shown in FIG. 15, by using two of the system components together as in FIGS. 2A and 2B, the base 16 that they are attached to oscillates freely on an axle 20 in a hinge 17. The hinge 17 can then attached to an object to be propelled without tipping the object side to side with the oscillations. The hinge design has the benefit of smoother motion at the cost of greater weight and requiring electric motors for the rotation as opposed to being able to use an internal combustion engine.

Figure 16:
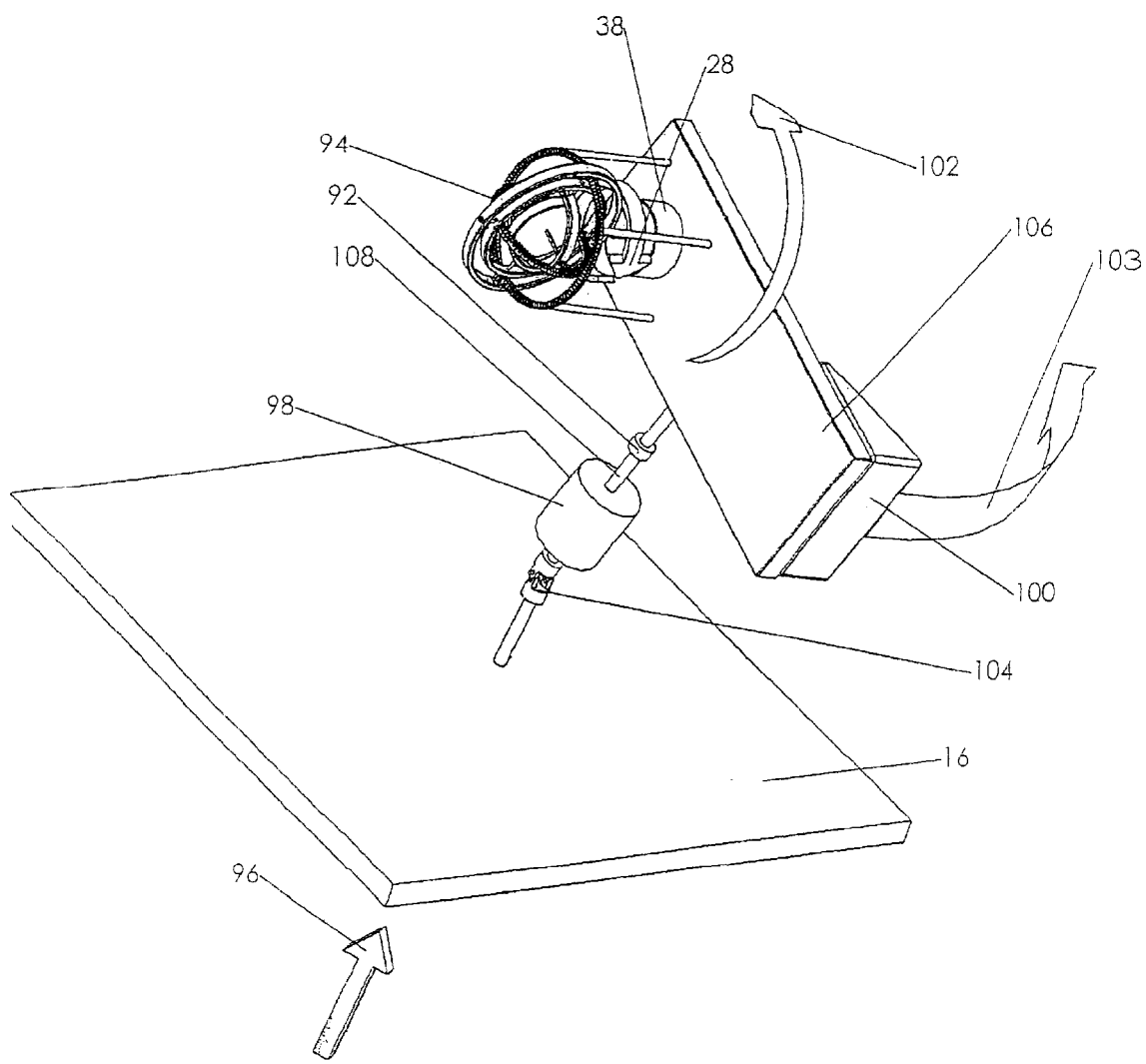
FIG. 16 is an elevated perspective view of an alternate embodiment of the system.

Another optional embodiment is shown in FIG. 16. By spinning the direction of the torque reaction 102 from the present invention 94 it becomes unnecessary to switch the torque from side to side as in FIGS. 14 and 15. Thus, the electric motors do not have to start and stop, but can be under a continuous load, reducing wear and tear on the motors. By spinning the torque around an axis 103 to gyrate a platform upon a universal joint 104, the result is an upward force 96.

To spin the system assembly 94 the power to the drive motor 38 must be conducted through a brush 92 to prevent wire tangling. Spinning the assembly with an electric motor 98 to change the direction of torque also requires a counterweight 100 at the opposite end of a frame 106 that the assembly 94 is mounted to. The frame 106 attaches to the motor axle 108 to cause the assembly 94 to rotate with the oscillation motor 98.

While certain embodiments of the present invention have been shown and described it is to be understood that the present invention is subject to many modifications and changes without departing from the spirit and scope of the claims presented herein.

I claim:
1. A gyroscopic device comprising:
   a base;
   a drive gimbal including a substantially planar drive gimbal drive ring coupled to said base;
   a motor mounted on said base and coupled to said drive gimbal to spin said drive gimbal continuously and completely about a drive gimbal axis;
   a precession gimbal spinning continuously and completely about a precession gimbal axis substantially perpendicular to the plane of said drive gimbal drive ring; and
   a gyro simultaneously rotating about said precession gimbal axis and spinning about a moving gyro spin axis in a plane substantially parallel to the plane of said drive gimbal drive ring, the spin of said gyro coupled to and guided by said drive gimbal drive ring such that said gyro is caused to spin when said motor drives said drive gimbal drive ring to spin, the gyro rotation and spin generating a precession force about the drive gimbal axis that is transmitted to said precession gimbal and, in turn, to said base through said drive gimbal and is opposite the direction of the drive gimbal spin when the gyro is guided in a first direction and coincident the direction of the drive gimbal spin when the gyro is guided in a second direction opposite the first direction.

2. The device of claim 1 further comprising a platform, said gyroscopic device mounted on said platform such that the precession force is parallel to said platform.

3. The device of claim 2 further comprising a second gyroscopic device mounted to said platform such that the precession forces of the two gyroscopic devices are parallel.

4. The device of claim 3 wherein the second gyroscopic device is mounted to said platform such that the precession forces of the two gyroscopic devices are coplanar.

5. The device of claim 3 further comprising a pivot disposed perpendicular to said precession forces about which said platform may rotate such that at least a component of the rotational forces generated by said gyroscopic devices and transmitted to said platform are converted to linear force.

6. A device comprising:
   a base;
   a stationary gimbal including a substantially planar stationary gimbal drive ring fixed to said base;
   a drive gimbal including a substantially planar drive gimbal drive ring;
   a motor mounted on said base and coupled to said drive gimbal to spin said drive gimbal continuously and completely about a drive gimbal axis substantially perpendicular to the plane of said stationary gimbal drive ring;
   a precession gimbal spinning about a precession gimbal axis substantially perpendicular to said drive gimbal drive ring, said precession gimbal coupled to said stationary gimbal drive ring and said drive gimbal to drive said precession gimbal to spin continuously and completely about said precession gimbal axis when said drive gimbal is spun; and
   a gyro rotating about said precession gimbal axis and spinning about a moving gyro spin axis in a plane substantially parallel to the plane of said drive gimbal drive ring, said gyro coupled to said drive gimbal drive ring and said precession gimbal to cause said gyro to rotate about said precession gimbal axis and spin about said gyro spin axis when said precession gimbal and said drive gimbal drive ring are spun, the direction of the gyro rotation and spin generating a precession force about the drive gimbal axis opposite the direction of the drive gimbal spin that is transmitted to said drive gimbal through said precession gimbal, to said motor through said drive gimbal, and to said base through said motor to said base through said motor.

* * * * *